(12) United States Patent
Shida

(10) Patent No.: US 8,353,630 B2
(45) Date of Patent: Jan. 15, 2013

(54) FLUID DYNAMIC BEARING WITH A LABYRINTH SEAL

(75) Inventor: Kunihiro Shida, San Jose, CA (US)

(73) Assignee: HGST, Netherlands B.V., Amsterdam (NL)

( * ) Notice: Subject to any disclaimer, the term of this patent is extended or adjusted under 35 U.S.C. 154(b) by 726 days.

(21) Appl. No.: 11/973,822

(22) Filed: Oct. 9, 2007

(65) Prior Publication Data
US 2009/0092346 A1 Apr. 9, 2009

(51) Int. Cl.
*F16C 32/06* (2006.01)

(52) U.S. Cl. ..... 384/100; 384/107; 384/112; 29/898.02; 360/99

(58) Field of Classification Search ............... 384/100, 384/107, 110, 112, 115, 130, 132, 119–120, 384/124; 29/898.02, 898.04, 898.041; 360/98.08, 360/99.08
See application file for complete search history.

(56) References Cited

U.S. PATENT DOCUMENTS

| | | | |
|---|---|---|---|
| 4,830,384 A * | 5/1989 | Raj et al. ............. | 277/410 |
| 5,246,294 A * | 9/1993 | Pan ..................... | 384/119 |
| 5,357,163 A | 10/1994 | Minakuchi et al. | |
| 5,658,080 A * | 8/1997 | Ichiyama ............. | 384/112 |
| 5,822,846 A * | 10/1998 | Moritan et al. ...... | 384/120 |
| 5,876,124 A * | 3/1999 | Zang et al. .......... | 384/107 |
| 5,876,126 A * | 3/1999 | Marshall et al. ..... | 384/480 |
| 5,925,955 A * | 7/1999 | Norris ................ | 310/90 |
| 5,957,589 A | 9/1999 | Lee et al. | |
| 6,066,903 A | 5/2000 | Ichiyama | |
| 6,126,320 A * | 10/2000 | Ichiyama ............. | 384/112 |
| 6,217,218 B1 | 4/2001 | Inoue et al. | |
| 6,243,230 B1 | 6/2001 | Nii et al. | |
| 6,246,136 B1 * | 6/2001 | Ichiyama ............. | 310/90 |
| 6,339,515 B2 * | 1/2002 | Lee et al. ........... | 384/112 |
| 6,746,151 B2 * | 6/2004 | Le et al. ............. | 384/107 |
| 6,851,861 B2 | 2/2005 | Price et al. | |
| 6,900,568 B2 * | 5/2005 | LeBlanc et al. ..... | 310/90 |
| 7,001,073 B2 * | 2/2006 | Hoffmann et al. ... | 384/107 |
| 7,131,770 B2 * | 11/2006 | Neumann ........... | 384/119 |
| 7,210,850 B2 * | 5/2007 | Kusaka et al. ...... | 384/107 |
| 2002/0003678 A1 * | 1/2002 | Sakuragi et al. .... | 360/99.08 |
| 2003/0190100 A1 * | 10/2003 | Grantz et al. ....... | 384/132 |
| 2003/0234589 A1 * | 12/2003 | Parsoneault et al. | 310/90 |
| 2005/0111766 A1 | 5/2005 | Gotoh et al. | |
| 2006/0018573 A1 * | 1/2006 | Sodeoka et al. ..... | 384/100 |
| 2006/0284504 A1 * | 12/2006 | Aiello et al. ........ | 310/90 |
| 2008/0304177 A1 * | 12/2008 | Hendriks et al. .... | 360/97.02 |
| 2008/0310049 A1 * | 12/2008 | Shen et al. .......... | 29/898.041 |

FOREIGN PATENT DOCUMENTS

| | | |
|---|---|---|
| JP | 61117759 | 6/1986 |
| JP | 61210560 A * | 9/1986 |
| JP | 7336924 | 12/1995 |
| JP | 09196060 A * | 7/1997 |
| JP | 9217735 | 8/1997 |
| JP | 9264320 | 10/1997 |
| JP | 10080091 A * | 3/1998 |

(Continued)

*Primary Examiner* — Marcus Charles

(57) ABSTRACT

A device for providing an air-gap associated with a portion of a fluid dynamic bearing, a sleeve is provided and surrounds a portion of a shaft. The sleeve and the shaft are configured for establishing the air-gap proximal to a portion of the fluid dynamic bearing. In addition, a cap is also provided and coupled to the sleeve. The cap has an outer end proximal to a portion of the fluid dynamic bearing such that the air-gap is provided between the outer end of the cap and the portion of the fluid dynamic bearing, wherein the air-gap forms a labyrinth seal.

3 Claims, 5 Drawing Sheets

FOREIGN PATENT DOCUMENTS

| | | | |
|---|---|---|---|
| JP | 10148212 | | 6/1998 |
| JP | 2000060055 | | 2/2000 |
| JP | 2000192947 | * | 7/2000 |
| JP | 2000205246 A | * | 7/2000 |
| JP | 2000354349 | | 12/2000 |
| JP | 2003130066 | | 5/2003 |
| JP | 2003287024 | | 10/2003 |
| JP | 2006136180 A | * | 5/2006 |
| JP | 2007205369 A | * | 8/2007 |
| WO | WO 2005001300 A1 | * | 1/2005 |

* cited by examiner

400

PROVIDE A SLEEVE SURROUNDING A PORTION OF A SHAFT, THE SLEEVE AND THE SHAFT CONFIGURED FOR ESTABLISHING A FLUID DYNAMIC BEARING BETWEEN THE SLEEVE AND THE SHAFT
402

PROVIDE A CAP COUPLED TO THE SLEEVE, THE CAP HAVING AN OUTER END PROXIMAL TO A PORTION OF THE FLUID DYNAMIC BEARING SUCH THAT AN AIR-GAP IS PROVIDED BETWEEN THE OUTER END OF THE CAP AND THE PORTION OF THE FLUID DYNAMIC BEARING, WHEREIN THE AIR-GAP FORMS A LABYRINTH SEAL
404

FIG. 4

FLUID DYNAMIC BEARING WITH A LABYRINTH SEAL

TECHNICAL FIELD

The present invention relates to the field of hard disk drive development, and more particularly to resolving evaporation of the lubrication or fluid in a fluid dynamic bearing.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

In operation, the hard disk is rotated at a set speed via a spindle motor assembly having a central drive hub. Additionally, there are tracks spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Areal densities of hard disk drives (HDD) in the past have increased at significant rates of 60 percent to more than 100 percent per year. This trend has slowed more recently to approximately 40 percent per year due to technology challenges. Areal densities today are close to 100 Gb/in2. HDDs are being used more often as digital applications in the consumer electronics industry proliferates, requiring much higher capacities and setting new expectation for lower acoustics. All of the above makes fluid dynamic bearing spindle motors attractive for minimizing non repeatable runout (NRRO), lowering acoustical noise, and improving reliability.

Presently, the transition from ball bearing (BB) spindle motors to fluid dynamic bearings (FDB) is almost complete in the HDD industry. In general, by incorporating FDB motors in HDD designs higher areal densities and much faster spindle speeds are achieved for today's applications. For example, NRRO is the highest contributor to track mis-registration (TMR), thus impacting HDD performance. NRRO is also an inhibitor in achieving higher track densities. Ball bearing motors produce larger NRRO due to the mechanical contact with the inherent defects found in the geometry of the race ball interface and the lubricant film. Ball bearing spindle motors have minimized this issue with tighter tolerances and closer inspections. There is an upper limit beyond which the ball bearing design can no longer overcome the NRRO problem at the higher areal densities. Currently with ball bearings, NRRO has settled in the 0.1 micro-inch range.

By contrast, FDBs generate less NRRO due to absence of contact between the rotor and stator. FDB designs are expected to limit NRRO in the range of 0.01 micro-inch. Other inherent properties of the FDB design are higher damping, reduced resonance, better non-operational shock resistance, greater speed control, and improved acoustics. Non-operational shock improvement is a result of a much larger area of surface-to-surface contact. Noise levels are reduced to approximately 20 dBA, since there is no contributing noise from ball bearings.

However, one problem with FDB is the evaporation of the lubrication or fluid within the bearing. In many instances, evaporation of the lubrication fluid greatly decreases the life of the bearing due to the bearing having insufficient lubricant.

SUMMARY

A device for providing an air-gap associated with a portion of a fluid dynamic bearing is disclosed. A sleeve is provided and surrounds a portion of a shaft. The sleeve and the shaft are configured for establishing the air-gap proximal to a portion of the fluid dynamic bearing. In addition, a cap is also provided and coupled to the sleeve. The cap has an outer end proximal to a portion of the fluid dynamic bearing such that the air-gap is provided between the outer end of the cap and the portion of the fluid dynamic bearing, wherein the air-gap forms a labyrinth seal.

BRIEF DESCRIPTION OF THE DRAWINGS

FIG. 4 is a flowchart of a method for forming a fluid dynamic bearing with an air-gap in accordance with one embodiment of the present invention.

The drawings referred to in this description should not be understood as being drawn to scale unless specifically notes.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Overview of Discussion

The discussion will begin with an overview of a hard disk drive and components connected therewith. The discussion will then focus on embodiments of a method and system for forming an air-gap associated with a portion of a fluid dynamic bearing (FDB) in particular. Although the fluid dynamic bearing is shown in a hard disk drive, it is understood that the embodiments described herein are useful in a fluid dynamic bearing regardless of whether the fluid dynamic bearing is a portion of a hard disk drive. The utilization of the fluid dynamic bearing within the HDD is only one embodiment and is provided herein merely for purposes of brevity and clarity.

In general, embodiments of the present invention provide a method and apparatus for forming an air-gap associated with a portion of a fluid dynamic bearing (FDB). For example, one problem with traditional fluid dynamic bearing (FDB) is the evaporation of the lubricant within the bearing. The lubricant becomes hot under the rotational pressure of the motor, and evaporates or turns to a mist. For example, when the motor rotates at a high speed, such as at 15,000 rpm, the lubricant may mist and then migrate to other areas. This results in reduced friction handling capability of the remaining lubricant in the FDB. Once the lubricant's evaporation and migration begins, the amount of lubricant in the FDB lessens, and the time to catastrophic failure also lessens.

However, by utilizing the cap/sleeve implementation described herein, the possibility for evaporation and migration is significantly reduced. In other words, the pressure adjusting capabilities of the fluid dynamic bearing is maintained via the air-gap while the possibility of evaporation and migration into areas other than the FDB is significantly decreased.

Operation of Example Hard Disk Drive

Figure 1A:
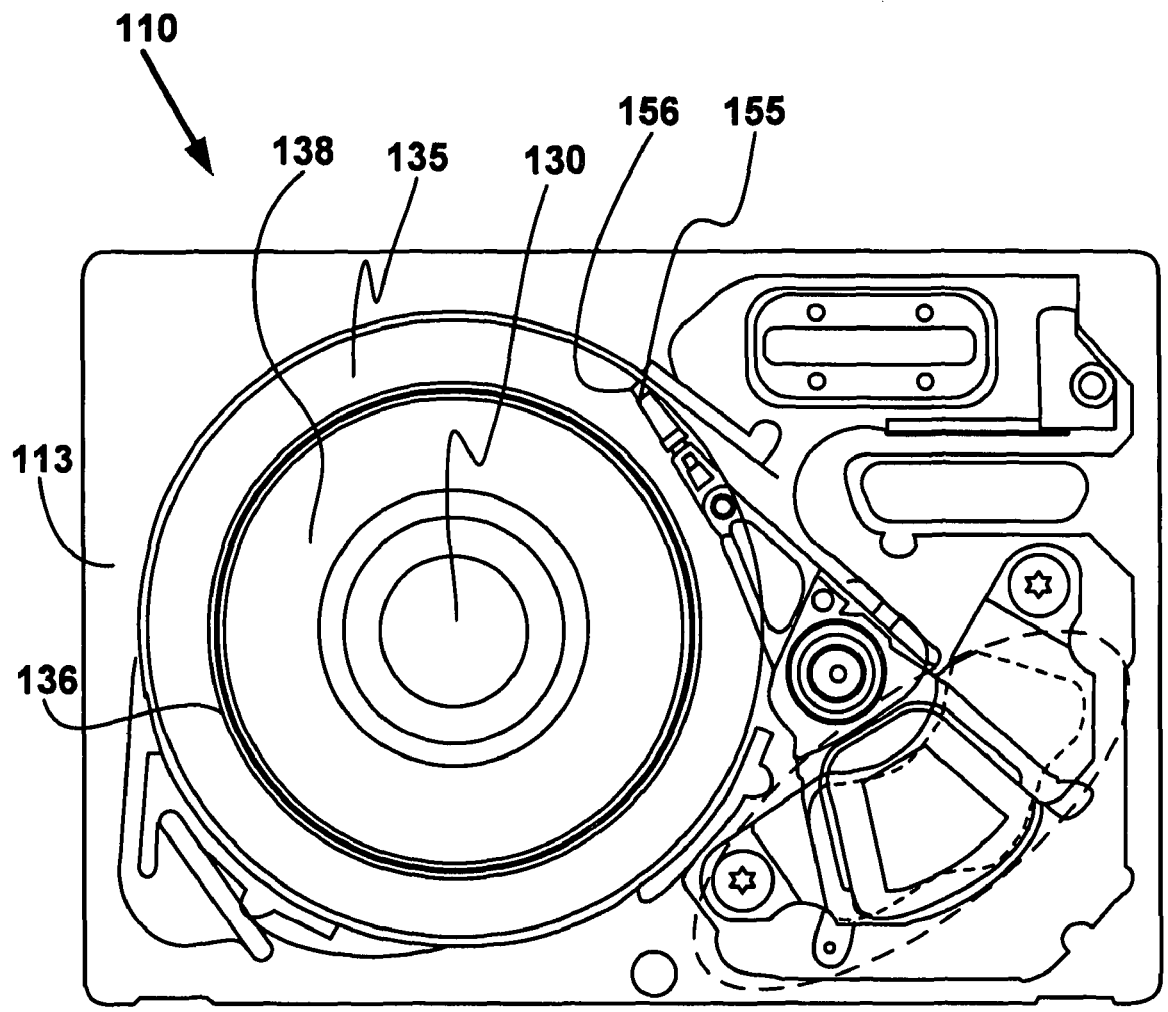
FIG. 1A is a plan view of an HDD with cover and top magnet removed in accordance with one embodiment of the present invention.
Figure 1B:
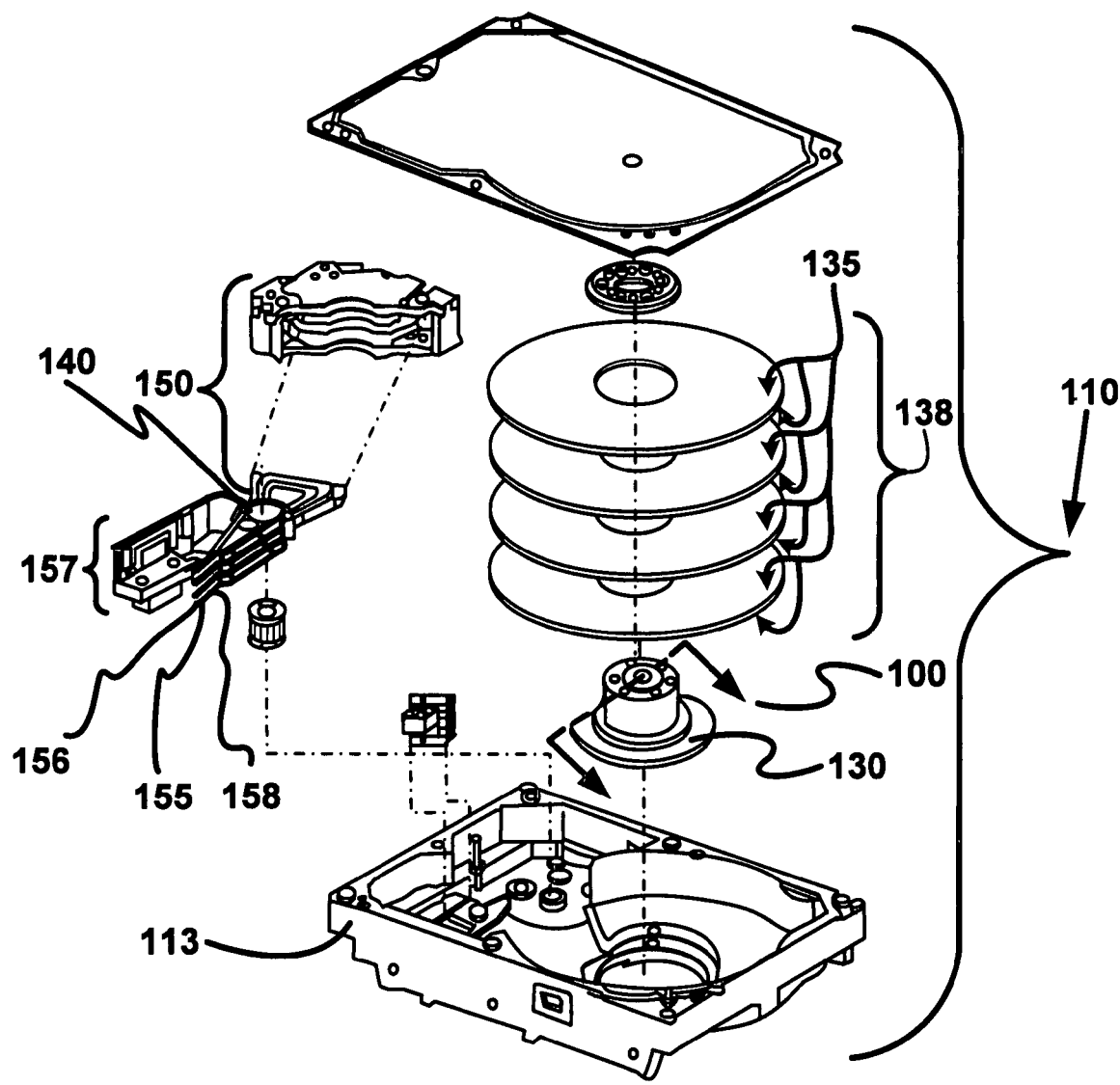
FIG. 1B is an isometric blow-apart of an HDD in accordance with one embodiment of the present invention.

With reference now to FIG. 1A, the relationship of components and sub-assemblies of a hard disk drive (HDD) 110 having a single disk 138 and a representation of data tracks 136 recorded on disk surface 135 is shown. In general, the cover is removed and not shown so that the inside of HDD 110 is visible. FIG. 1B shows a similar HDD 110, but with all its components in an isometric blow-apart view. The components, such as the plurality of disks 138, are assembled into base casting 113, which provides attachment and registration points for components and sub-assemblies. Data is recorded onto disk surface 135 in a pattern of concentric rings known as data tracks 136. Actuator assembly 157 comprises suspension 158, which suspends hard disk drive slider 155 next to disk surface 135. Disk surface 135 is spun at high speed by means of a motor-hub assembly 130. Data tracks 136 are recorded onto disk surface 135 by means of magnetic head 156 (comprising a red/write head element), which typically resides at the trailing edge (TE) portion of slider 155. FIG. 1A being a plan view shows only one head and one disk surface combination. One skilled in the art understands that what is described may be used for one head-disk combination or a plurality of head-disk combinations. The embodied invention is independent of the number of disks in general and the number of head-disk combinations in general.

The dynamic performance of HDD 110 is a major mechanical factor for achieving higher data capacity as well as for manipulating this data faster. The quantity of data tracks 136 recorded on disk surface 135 is determined partly by how well magnetic head 156 and a desired data track 136 can be positioned to each other and made to follow each other in a stable and controlled manner. There are many factors that will influence the ability of HDD 110 to perform the function of positioning magnetic head 156, and following data track 136 with magnetic head 156. In general, these factors can be put into two categories; those factors that influence the motion of magnetic head 156; and those factors that influence the motion of data track 136. Undesirable motions can come about through unwanted vibration and undesirable tolerances of components. Herein, attention is given to motor-hub assembly 130, which attaches to base casting 113, and in particular, attention is given to the fluid dynamic bearing inside motor-hub assembly 130.

Figure 2:
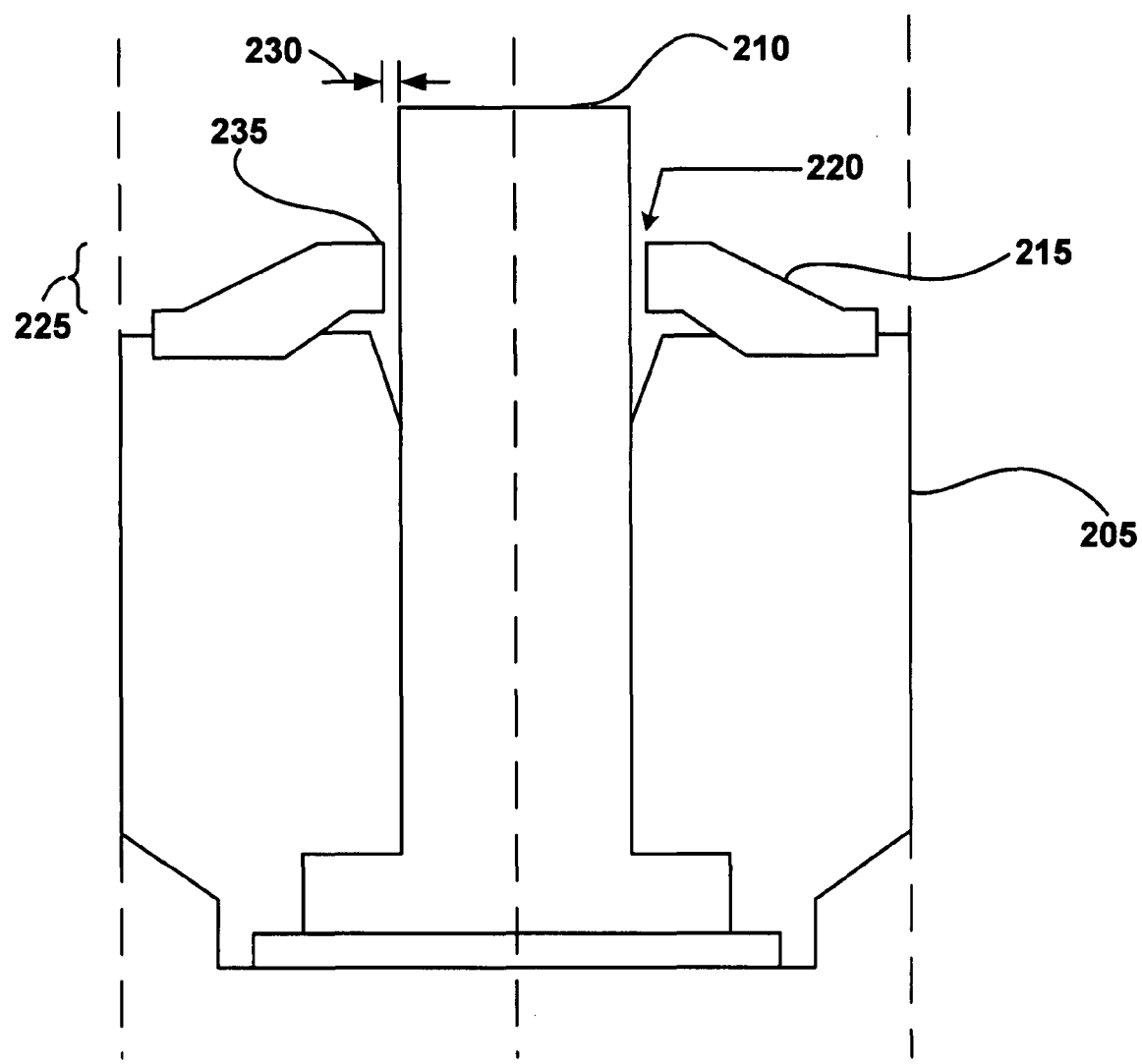
FIG. 2 is a sectional view of an example cap/rotatable shaft motor orientation having an air-gap forming a labyrinth seal in accordance with one embodiment of the present invention.

With reference now to FIG. 2, a sectional view of a Fluid Dynamic Bearing 200 is shown. In FDB 200, an example cap/rotatable shaft motor orientation having an air-gap forming a labyrinth seal is shown in accordance with one embodiment of the present invention. In one example embodiment, the fluid dynamic bearing includes a plurality of components such as a sleeve, shaft and taper bush. A labyrinth seal is formed with multiple components. At least one of these components is a part of the components of which the fluid dynamic bearing consists. For example, in FIG. 2, a labyrinth seal is created by shaft 210 and cap 215, with air-gap 220 in between. In one embodiment, cap 215 is configured such that a vertical length 225 of air-gap 220 between the outer end of cap 215 and a portion of the fluid dynamic bearing 200 (in this case, shaft 210) is approximately ten times the horizontal width 230 of air-gap 220. For example, the labyrinth seal is a cylindrical air-gap with less than 0.1 mm of horizontal width 230 and more than 1 mm of vertical length 225. In other words, the width of air-gap 220 is shorter than its length.

In one embodiment, shaft 210 is the rotating portion of the FDB. In operation, the fluid area within the FDB is not a sealed environment but is instead vented to atmospheric pressure. The reasons for venting the FDB are numerous and well-known in the art, but one important reason for the venting is related to the operational environments within which the FDB is located. For example, the FDB may be part of a hard drive that is used at sea level, on an aircraft, at higher elevation, and the like. As such, there is a need to have an air-gap to allow the air-pressure within the FDB to equalize.

In one embodiment, sleeve 205 is coupled with a rotatable shaft motor. In another embodiment, cap 215 has an outer end 235 proximal to shaft 210 such that air-gap 220 is formed between the outer end of cap 215 and shaft 210. Cap 215 is stationary, while sleeve 205 rotates about shaft 210. Cap 215 may be made from any metal having stable thermo expansion characteristics able to endure operations within a defined range, such as a spindle motor rotating between 10,000 to 17,000 r.p.m.

Figure 3:
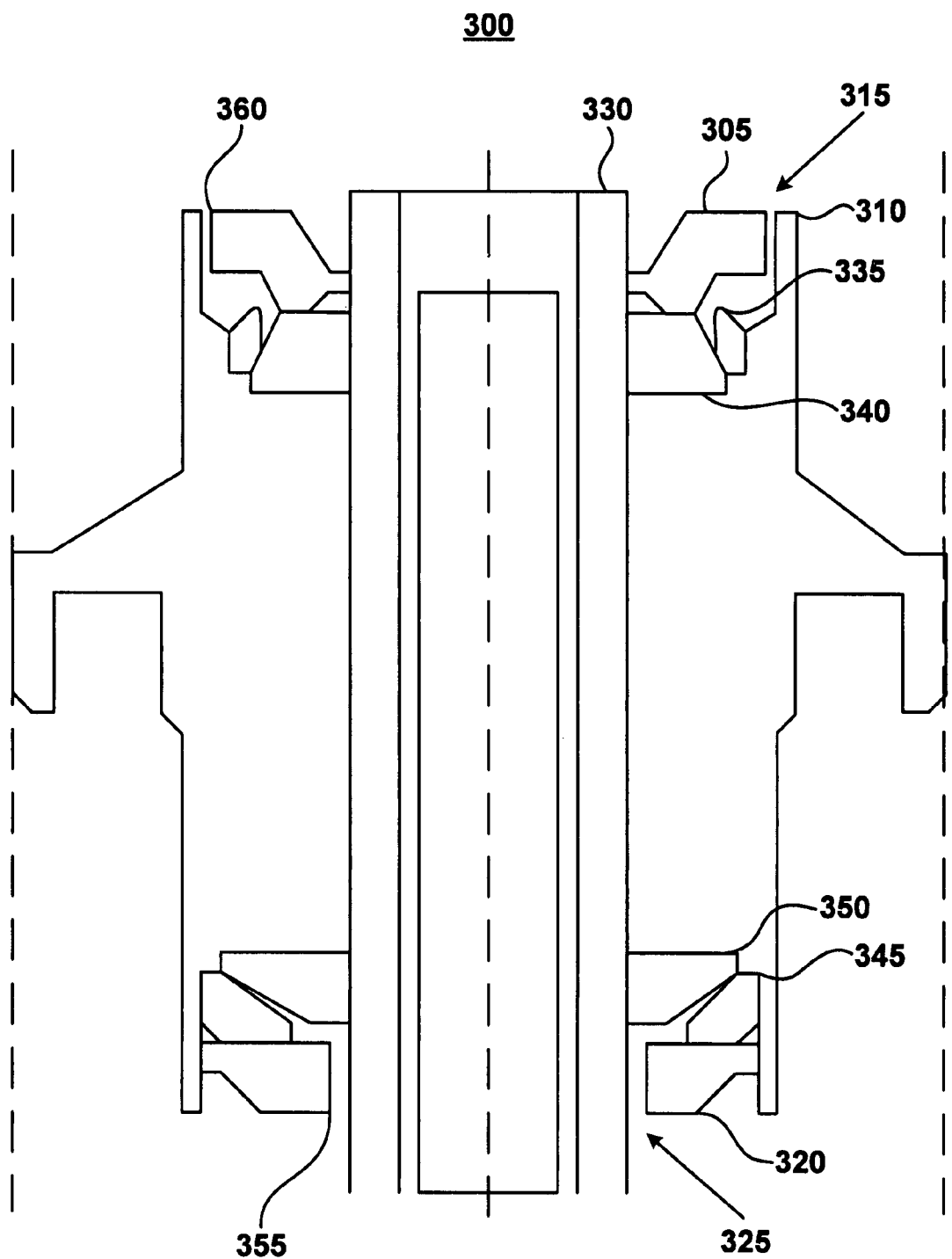
FIG. 3 is a sectional view of an example cap/sleeve orientation associated with a tie shaft motor having an air-gap forming a labyrinth seal, and an example cap/shaft orientation having an air-gap forming a labyrinth seal, in accordance with one embodiment of the present invention.

Referring now to FIG. 3, a sectional view of a Fluid Dynamic Bearing 300 is shown. In FDB 300, an example cap 305/sleeve 310 orientation associated with a tied shaft motor having air-gap 315 forming a labyrinth seal, and an example cap 320/shaft 330 orientation having air-gap 325 forming a labyrinth seal, in accordance with one embodiment of the present technology. Additionally, taper bushes 335 and 345, as well as thrust plates 340 and 350, are shown.

In one embodiment, sleeve 310 is coupled with tied motor shaft 330. In another embodiment, cap 305 has an outer end 360 proximal to a portion of sleeve 310 such that air-gap 315 is formed between the outer end 350 of cap 305 and sleeve 310. Cap 305 is stationary and is next to sleeve 310 which is rotating.

In another embodiment in which sleeve 310 is coupled with tied motor shaft 330, cap 320 has an outer end 355 proximal to shaft 330 such that air-gap 325 is formed between the outer end 355 of cap 320 and shaft 330. Cap 320 is rotating and is next to shaft 330 which is stationary.

In one embodiment, tied motor shaft 330 may be associated with two labyrinth seals, both displaying the air-gap 315 as depicted in FIG. 3. In a different embodiment, tied motor shaft 330 may be associated with two labyrinth seals, both displaying the air-gap 325 as depicted in FIG. 3. In yet another embodiment, tied motor shaft 330 may be associated with two labyrinth seals, one forming air-gap 315, and another forming air-gap 325. Furthermore, cap 305 and cap 320 may be made from any metal having stable thermo expansion characteristics able to endure operations within a defined range, such as a spindle motor rotating between 10,000 to 17,000 r.p.m.

FIG. 4 is a flowchart of a method to form an air-gap associated with a portion of a fluid dynamic bearing in accordance with one embodiment of the present invention.

With reference now to 402 of FIG. 4 and to FIG. 2, one embodiment provides a sleeve 205 surrounding a portion of shaft 210. Sleeve 205 and shaft 210 are configured for establishing air-gap 220 proximal to a portion of a fluid dynamic bearing. With reference still to 402 of FIG. 4 and now to FIG. 3, one embodiment provides a sleeve 310 surrounding a portion of a shaft 330. Sleeve 310 and shaft 330 are configured for establishing air-gap 315 and/or air-gap 325 proximal to a portion of a fluid dynamic bearing. The present technology may be utilized in a single disk hard disk drive or a hard disk drive with a plurality of disks. Moreover, in another embodiment, the present FDB design, is not limited to, and may be used in applications other than hard disk drives.

Referring now to 404 of FIG. 4 and to FIG. 2, one embodiment provides cap 215 coupled with sleeve 205. Cap 215 has an outer end 235 proximal to a portion of the fluid dynamic bearing such that air-gap 220 is provided between the outer end 235 of cap 215 and the portion of the fluid dynamic bearing, wherein air-gap 220 forms a labyrinth seal. In one embodiment, a fluid dynamic bearing is provided, which comprises shaft 210, sleeve 205, and a taper bush.

In one example of the present technology, sleeve 205 is coupled with a rotatable shaft motor. Furthermore, one embodiment provides cap 215 having an outer end 235 proximal to shaft 210 such that air-gap 220 is formed between the outer end 235 of cap 215 and shaft 210.

In another example of the present technology, sleeve 310 is coupled with shaft 330 of a tied shaft motor. Furthermore, one embodiment provides cap 305 having an outer end 350 proximal to a portion of sleeve 310 such that air-gap 315 is formed between the outer end 350 of cap 305 and sleeve 310. Another embodiment provides cap 320 having an outer end 355 proximal to shaft 330 such that air-gap 325 is formed between the outer end 355 of cap 320 and shaft 330.

Thus, embodiments of the present invention provide a method and apparatus for forming an air-gap associated with a portion of a fluid dynamic bearing. Additionally, embodiments described herein, decrease the migration of lubricant within an FDB, thereby maintaining and/or lengthening the expected life-span of the FDB.

What is claimed is:

1. A method to form an air-gap associated with a portion of a fluid dynamic bearing, said method comprising:
   providing a sleeve surrounding a portion of a shaft, said sleeve and said shaft configured for establishing an air-gap proximal to a portion of a fluid dynamic bearing, and wherein said shaft is one of a rotatable shaft motor and a tied shaft motor;
   providing a cap coupled with said sleeve, said cap having an outer end proximal to a portion of said shaft of said fluid dynamic bearing such that said air-gap is formed between and adjacent to said outer end of said cap and said shaft, wherein said air-gap forms a labyrinth seal; and
   wherein a depth said air-gap between said outer end of said cap and said portion of said fluid dynamic bearing is ten times the distance of said air-gap.

2. A hard disk drive comprising:
   a housing;
   at least one disk mounted to the housing and rotatable relative to the housing;
   an actuator mounted to said housing and being movable relative to said at least one disk, said actuator having a suspension for reaching over said at least one disk, said suspension having a slider coupled therewith, said slider having a read/write head element on a trailing edge (TE) portion of said slider;
   a sleeve surrounding a portion of a shaft, said sleeve and said shaft configured for establishing an air-gap proximal to a portion of a fluid dynamic bearing, and wherein said shaft is one of a rotatable shaft motor and a tied shaft motor; and
   a cap coupled with said sleeve, said cap having an outer end proximal to said portion of said shaft of said fluid dynamic bearing such that said air-gap is formed between and adjacent to said outer end of said cap and said shaft for the purpose of forming a labyrinth seal wherein a depth of said air-gap between said outer end of said cap and said portion of said fluid dynamic bearing is ten times the distance of said air-gap.

3. A device for providing an air-gap associated with a portion of a fluid dynamic bearing, said device comprising:
   a sleeve surrounding a portion of a shaft, said sleeve and said shaft configured for establishing an air-gap proximal to a portion of a fluid dynamic bearing, and wherein said shaft is one of a rotatable shaft motor and a tied shaft motor; and
   a cap coupled with said sleeve, said cap having an outer end proximal to a portion of said shaft of said fluid dynamic bearing such that said air-gap is formed between and adjacent to said outer end of said cap and said shaft, for the purpose of forming a labyrinth seal, wherein the vertical length of said air-gap between said outer end of said cap and said portion of said fluid dynamic bearing is ten times longer than the horizontal width of said air-gap.

* * * * *